INVENTOR.
THOMAS R. O'MEARA,
BY Robert W. Hines
ATTORNEY

INVENTOR.
THOMAS R. O'MEARA,
BY Robert H. Himes
ATTORNEY.

United States Patent Office 3,116,455

Patented Dec. 31, 1963

3,116,455

HIGH EFFICIENCY AMPLIFIER

Thomas R. O'Meara, Los Angeles, Calif., assignor to Hughes Aircraft Company, Culver City, Calif., a corporation of Delaware Filed Oct. 1, 1959, Ser. No. 843,871

3 Claims. (Cl. 328—27)

This invention relates to a vacuum tube amplifier apparatus and more particularly to a vacuum tube amplifier wherein a substantial portion of the power normally dissipated on the anode of the tube is transformed to an external load.

It is generally realized that the size, weight and cost of an amplifier are approximately proportionate to the required anode power dissipation. The size and weight of a transmitter amplification stage are particularly important in portable or airborne systems.

A principal object of the present invention is to provide a high efficiency amplifier of reduced size, weight and cost over that of conventional type amplifiers.

Another object of the present invention is to provide an output amplifier wherein a substantial portion of the power which normally is dissipated and lost at the anode of the vacuum tube or other active device thereof when operating as a class-C amplifier is transferred to an auxiliary anode load impedance thereby enabling the use of smaller vacuum tubes for a desired power output.

Still another object of the present invention is to produce a high efficiency amplifier capable of producing an output signal having substantially no secondary harmonic content in the output waveform thereof and an appreciably weaker third harmonic content than is usually found in a conventional class-C amplifier.

A further object of the present invention is to provide a high efficiency amplifier wherein energy formerly dissipated at the anode of the tube is transferred from the tube, rectified and returned to a direct-current power supply system.

A still further object of the invention is to provide an apparatus capable of producing an output signal having a fundamental component with an amplitude that is approximately proportional to the pulse-width of the input signal applied thereto.

According to the present invention a substantial portion of the energy which normally is dissipated at the anode of a vacuum tube, which is biased so as to operate, in the absence of an input signal, in the cutoff region, is effectively transferred to an external auxiliary load impedance which is appropriately coupled to the anode circuit of the vacuum tube and, in addition, is connected in series with the output load impedance network. The combined input impedance to the auxiliary load and output load impedance network is designed to present a constant resistance to the tube anode for all frequencies. In operation, substantially all of the energy which is contained in the anode circuit waveform at the nominal operating frequency is transferred without loss to an output load resistor and represents useful output, while almost all of the energy which is contained in the harmonic frequencies is dissipated in an auxiliary load impedance. With this mode of operation, it is expedient to employ a grid driving waveform which maximizes the ratio of the energy at the fundamental frequency to the total energy in the pulse train in order to obtain large overall efficiency. This maximization is achieved, for example, with a square-wave driving signal having a duty factory substantially equal to 0.5.

The above-mentioned and other features and objects of this invention and the manner of obtaining them will become more apparent by reference to the following description taken in conjunction with the accompanying drawings, wherein.

Figures 1, 2:
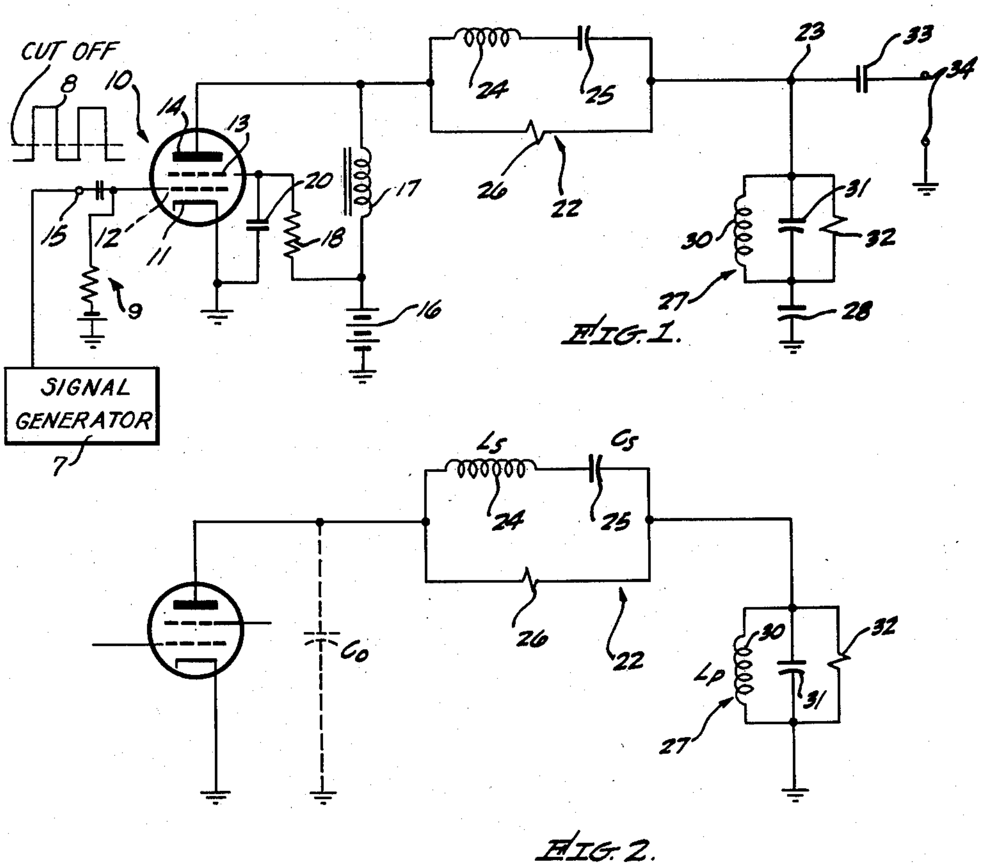
FIG. 1 illustrates a schematic circuit diagram of a preferred embodiment of the apparatus of the present invention.
FIG. 2 shows a high frequency equivalent circuit diagram of the apparatus of FIG. 1.

Referring now to FIG. 1 of the drawing, the high efficiency amplifier of the present invention comprises a beam power tetrode tube 10 which may, for example, be of a type designated commercially as a 6CB5. The tube 10 includes a cathode 11, a control grid 12, a screen grid 13, and a plate 14, the control grid 12 being connected to an input terminal 15 and the cathode 11 being connected directly to ground. A signal generator 7, which may be a variable pulse width signal generator (FIG. 3), is coupled to the terminal 15 to develop a switching pulse of a waveform 8 having a dotted line indicating the tube cut off level. Suitable D.C. biasing means 9 are provided to bias the tube non-conductive in the absence of a positive pulse of the waveform 8 and may include a coupling capacitor connected between the terminal 15 and the grid 12 and a resistor and battery connected in series between the grid 12 and ground. A source of B+ potential is provided by a battery 16, the negative terminal of which is connected to ground and the positive terminal connected through a radio-frequency choke 17 to the plate 14 of the tube 10. The direct-current voltage provided by battery 16 may, for example, be of the order of 1000 volts. The screen grid 13 of tube 10 is maintained at a potential of the order of +150 volts positive with respect to ground by means of a dropping resistor 18 connected from the positive terminal of battery 16 to screen grid 13, and a by-pass capacitor 20 connected from the screen grid 13 to ground.

An auxiliary load impedance in accordance with the present invention is provided by a parallel circuit 22 connected directly from the plate 14 of tube 10 to an output junction 23. Parallel circuit 22 includes a serially connected inductor 24 and capacitor 25 connected in parallel with a resistor 26. Inductor 24 has an inductance, $L_S$ henrys, the capacitor 25 a capacitance of $C_S$ farads and resistor 26 a resistance of $R_D$ ohms. In addition, the output load impedance network is provided by means of a parallel network 27 which is connected from the output junction 23 to a blocking capacitor 28 which is, in turn, connected to ground. The parallel load impedance network 27 includes an inductor 30, a capacitor 31 and a resistor 32 all connected in parallel. The inductance of inductor 30 is $L_P$ henrys, the capacitance of capacitor 31 is $C_P$ farads and the resistance of resistor 32 is $R_L$ ohms. The relationships which must necessarily exist between these parameters will be hereinafter described. Lastly, the output junction 23 is connected through an output capacitor 33 to the high side of output terminals 34.

Referring to FIG. 2, there is shown a substantially high-frequency equivalent circuit diagram of the device of FIG. 1. In this diagram it is assumed that the radio-frequency choke 17 presents a substantially infinite impedance to the high frequency signal and that the capacitor 28 presents a short circuit to the high-frequency signals. Also, in addition to the elements described in FIG. 1, it is necessary to take into consideration the plate 14 to cathode 11 capacitance of tube 10 and the stray capacitance to ground of the leads between plate 14 and the parallel auxiliary load impedance circuit 22. Thus, a capacitance of $C_0$ farad which includes both of these capacitances is shown with dashed lines connected from the plate 14 to ground.

In operating the device of the present invention, the pulse repetition frequency $f_0$ of the input signal is made the same as the desired output frequency. The parameters of the networks 22 and 27 are necessarily dependent on this output frequency $f_0$. In particular, the series circuit formed by inductor 24 and capacitor 25 is made series resonant at the output frequency, i.e.:

$$f_0=\frac{1}{2\pi\sqrt{L_S C_S}} \text{ or } L_S C_S=\frac{1}{\omega_0^2} \qquad (1)$$

wherein $\omega_0=2\pi f_0$. Also, the parallel resonant circuit formed by inductor 30 and capacitor of the load impedance network 27 are made to be parallel resonant at the output frequency, $f_0$, i.e.:

$$f_0\doteq\frac{1}{2\pi\sqrt{L_P C_P}} \text{ or } L_P C_P\doteq\frac{1}{\omega_0^2} \qquad (2)$$

where, as before, $\omega_0=2\pi f_0$. This relation neglects the resistance which is necessarily present in inductor 30. Further, inductance $L_S$, capacitance $C_P$, resistance $R_D$ and resistance $R_L$ are, preferably, so related that:

$$\frac{L_S}{C_P}=R_L^2=R_D^2 \qquad (3)$$

The above relation (3) is known as the "constant resistance" design criterion. Under the aforementioned conditions (1), (2) and (3), the combined input impedance to the auxiliary load impedance 22 and the output load impedance 27 is ideally a constant resistance at all frequencies and the resulting waveform at the plate 14 of tube 10 resulting from an input signal having a rectangular waveform will be perfectly rectangular. Thus, if the vacuum tube 10 were ideal, i.e., had zero interelectrode capacitances, it would operate with substantially perfect switching action and with very low energy dissipation at the plate 14.

Figures 3, 4:
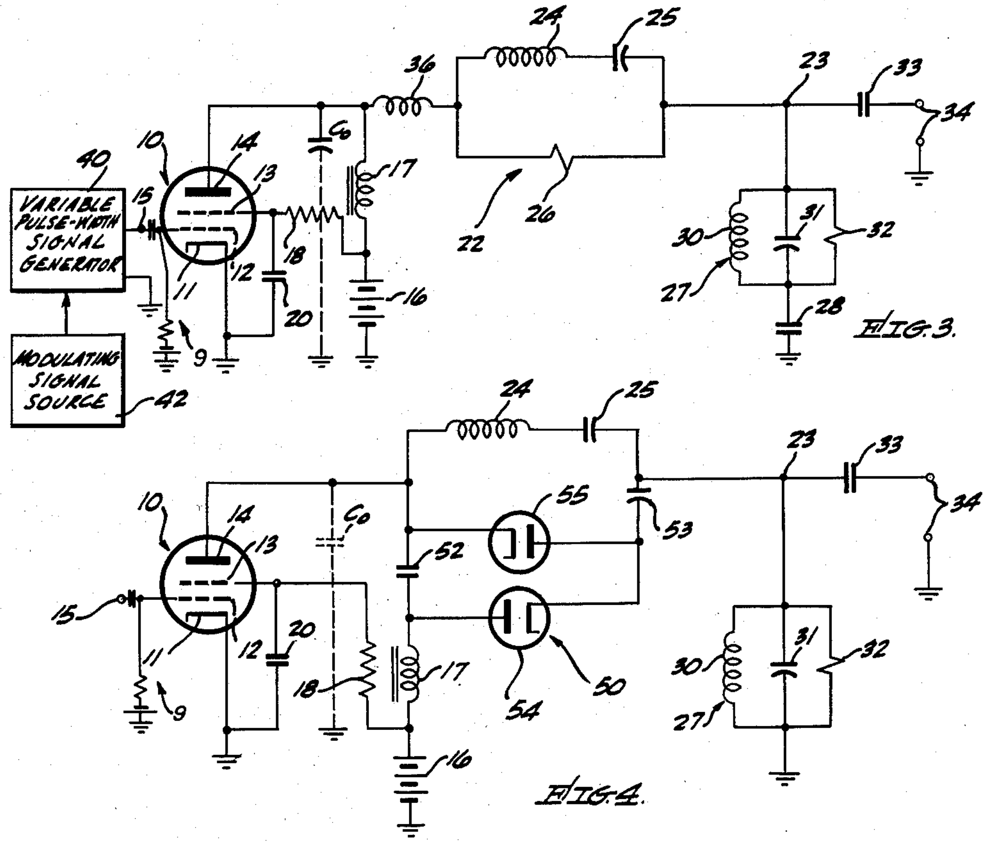
FIG. 3 illustrates a schematic circuit diagram of an embodiment similar to that of the device of FIG. 1 with the addition of a peaking coil inserted in the plate circuit of the tube thereof.
FIG. 4 illustrates a schematic circuit diagram of the device of the present invention with an auxiliary load impedance adapted to rectify and return energy to be dissipated to the direct-current supply.
Figure 5:
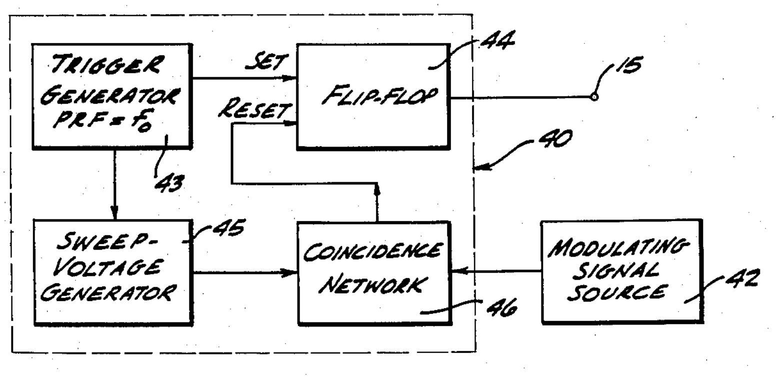
FIG. 5 shows a schematic block diagram of the variable pulse-width signal generator of the apparatus of FIG. 3.

Referring now to FIG. 3 of the drawing, there is shown a variable pulse-width input signal that is applied to the input terminal 15 by means of a variable pulse-width signal generator 40 which is connected thereto and which is responsive to an intelligence signal generated by a modulating signal generator 42. The variable pulse-width input signal may, for example, be generated in the manner illustrated in FIG. 5. Referring to this figure, a trigger generator 43 having a pulse-repetition-frequency $f_0$, which frequency is no less than ten times the highest frequency in the range of intelligence frequencies, is used to periodically set a flip-flop 44 that is, for example, to provide at its output a positive step signal for "turning on" the tube 10 concurrently with synchronizing the operation of a sweep-voltage generator 45. A coincidence network 46 produces a trigger signal at the time of each amplitude coincidence between the sweep-voltage generated by sweep-voltage generator 45 and the intelligence signal provided by modulating signal source 42. Suitable ampltiude compression apparatus may be used to limit the intelligence signal excursions so that a voltage amplitude coincidence always occurs within each pulse-repetition interval. The trigger signal produced by the coincidence network 46 is applied to the reset input of flip-flop 44, to provide at its output a negative step signal to "turn off" tube 10 whereby the widths of the pulses appearing at the principal output thereof and applied to the grid of tube 10 are proportional to amplitudes at periodic points of the intelligence signal. An increased pulse-width at the input terminal 15 produces a proportionately higher output signal across the resistor 32 of network 27 thus amplitude modulating the output signal to reproduce an amplified representation of the original input intelligence signal.

Returning now to FIG. 3, it appears that a small vacuum tube could be used to amplify a signal of arbitrarily large output power by using the teachings of the present invention. There are, however, two practical limitations: first, a small vacuum tube is limited by the amount of voltage which may be applied or switched without voltage breakdown occurring; and, second, the output capacitance $C_0$, inherently associated with any tube 10, precludes obtaining a perfectly rectangular waveform at the plate 14 thereof, even assuming an idealized composite constant resistance presented by the networks 22, 27 and an idealized input signal, i.e., a signal with zero rise and fall time, applied to the input terminal 15. Thus, there exists a component of energy dissipation at plate 14 which results from the charging and discharging the capacitance $C_0$, which becomes excessively large beyond a certain magnitude of output voltage. In particular, it may be shown that a minimum total energy dissipation on the plate results when the B+ voltage provided by battery 16 is just sufficiently high to equalize the capacitive discharge loss component with the energy dissipation which occurs as a result of imperfect switch action, i.e., non-zero anode-to-cathode voltage during the conducting portion of the cycle.

The capacitive discharge loss component for the circuit of FIG. 1, for example, is given by the relation:

$$P_{pc}=C_0 V_0^2 f_0 \text{ watts} \qquad (4)$$

where $C_0$ is the anode output capacitance and $V_0$ is the output voltage. By utilizing a peaking coil 36 interconnected between the plate 14 of tube 10 and the auxiliary load impedance network 22, as shown in FIG. 3, the capacitive discharge is accomplished more rapidly and the energy dissipated on the plate 14 is accordingly reduced by a factor of approximately one-half. The inductance of peaking coil 36 to reduce the energy dissipated on plate 14 in this manner should be designed substantially as in a conventional video network, that is, the inductance of coil 36 is selected to produce as fast a rise time as possible consistent with a small overshoot. A suitable design range is given by $$0.414<\frac{L_x}{C_0 R_L^2}<0.7 \qquad (5)$$

wherein $L_x$ is the inductance of peaking coil 36. When the relationship (5) is applied, the loss may be shown to be approximated by the following relation:

$$P_{pc}=\tfrac{1}{2} C_0 V_0^2 f_0 \text{ watts} \qquad (6)$$

By way of example, consider that a type 6CB5 tube is employed for the tube 10 in the embodiment of FIG. 3. A type 6CB5 tube has a maximum plate dissipation rating of 23 watts and a screen dissipation of 3.6 watts. An operating (bottoming) point of 50 volts is selected for the plate 14 and a voltage of 150 volts is selected for the screen 13, as previously specified. This corresponds to a peak screen current of about 45 milliamperes and a peak plate current of about 430 milliamperes. The resulting energy dissipations at the screen 13 and plate 14 are, respectively, about 3.38 watts and 10.8 watts for a square-wave plate-current-waveform. There remains an unused 12.2 watts of plate dissipation capacity which must absorb the capacitance discharge loss $P_{pc}$. This does not correspond exactly to an optimum design, as the loss components are not exactly balanced, but is close enough for practical purposes. Thus, in this case, the equation for the capacitive discharge loss from relation (4) is:

$$\tfrac{1}{2} C_0 V_0^2 f_0=12.2 \text{ watts} \qquad (7)$$

The rated output capacitance for a type 6CB5 tube is 10 micromicrofarad, but a value of 15 micromicrofarad is chosen to allow for additional capacitance to ground for wiring and components. If one assumes a desired output frequency $f_0$ of one megacycle, then relation (7) will specify a pulse output voltage $V_0$, and hence a plate supply voltage. Thus $$V_0=\left(\frac{2\times 12.2}{15\times 10^{-12}\times 10^6}\right)^{1/2}=1{,}265 \text{ volts} \qquad (8)$$

and the supply voltage should be 1,265+50=1,315 volts. The direct-current power input $P_{in}$ would then be approximately:

$$P_{in}\doteq\frac{1315\times 0.430}{2}\doteq 285 \text{ watts} \qquad (9)$$

The result is obtained that four "receiving" type 6CB5 tubes can be incorporated in an amplifier with over one kilowatt of input power. At lower operating frequencies, the input power may be increased still further so long as the maximum breakdown voltage of the tube is not exceeded.

The power dissipated at the plate 14 of tube 10 under the above conditions can be shown to be of the order of 23 watts whereby the power $P_N$ delivered into the networks 22, 27 is approximately $$P_N=283-23\doteq 260 \text{ watts} \qquad (10)$$

The plate efficiency $n_p$ is thus about $$n_p\doteq\frac{260}{283}\doteq 92\% \qquad (11)$$

Of the total power which is delivered to the plate networks 22, 27 about 81%, or approximately 211 watts, appears at $R_L$ as useful (sinusoidal) output. The remaining 49 watts is dissipated in the auxiliary load resistor 26 of resistance $R_D$. Thus neglecting losses in the reactive portionjs of the coupling networks 22, 27, the overall efficiency $n_A$ of the amplifier is approximately:

$$n_A\doteq\frac{211}{283}\doteq 74.5\% \qquad (12)$$

Referring now to FIG. 4 there is shown a schematic circuit diagram of the device of FIG. 1 wherein the auxiliary load impedance 22 is replaced with a rectifying impedance 50. The rectifying impedance 50 includes the series connected inductor 24 and capacitor 25. The radio-frequency choke 17 instead of being connected directly to the anode 14 of tube 10, however, is connected through diodes 54, 55 to the anode 14 in parallel with a capacitor 52. The junction between the diodes 54 and 55 is connected through a capacitor 53 to the junction between the impedance 50 and the output load impedance 27. The diodes 54, 55 are, of course, poled so as to allow current to flow from the battery 16 to the tube 10. In operation, the current rectified by the diodes 54, 55 supplements the direct-current flowing in the plate circuit of tube 10 which is provided by voltage source 16.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. An apparatus for amplifying an electrical signal of a predetermined fundamental frequency, said apparatus comprising a vacuum tube having a cathode, an anode and a control grid, said control grid being responsive to an input signal having a rectangular waveform and a pulse repetition frequency equal to said predetermined fundamental frequency; means connected from said cathode to said anode for applying a direct-current potential thereacross; means for biasing the potential of said control grid relative to the potential of said cathode to maintain said tube in a normally non-conductive state; and a substantially frequency independent resistive load for said vacuum tube including an output impedance coupled to said anode of said tube, said output impedance including a first inductor, a first capacitor and a first resistor connected in parallel, said first inductor and said first capacitor being parallel resonant at said predetermined fundemental frequency, and an auxiliary load impedance interposed between said anode and said output impedance, said auxiliary impedance including a serially connected second inductor and a second capacitor with rectification means coupled thereacross, said second inductor and said second capacitor being series resonant at said predetermined fundamental frequency.

2. An apparatus for amplifying an electrical signal of a predetermined fundamental frequency, said apparatus comprising a vacuum tube having a cathode, an anode and a control grid, said control grid being responsive to an input signal having a rectangular waveform and a pulse repetition frequency equal to said predetermined fundamental frequency, a substantially frequency independent resistive load for said vacuum tube including an output impedance coupled to said anode of said tube, said output impedance including a network that is parallel resonant at said predetermined fundamental frequency, and an inductor and a first capacitor coupled in series between said anode and said output impedance, a second capacitor coupled to said output impedance, a first diode having a first end coupled to said anode and a second end coupled to said second capacitor, a source of potential, a third capacitor coupled between the first end of said second diode and said source of potential, a second diode having a first end coupled between said third capacitor and said source of potential and a second end coupled to second capacitor, whereby signals developed across said inductor and said first capacitor are rectified and applied to said anode.

3. A device for amplifying an electrical signal of a predetermined fundamental frequency comprising a vacuum tube having a cathode, an anode and a control grid, said control grid being responsive to an input signal having a rectangular waveform and a pulse repetition frequency equal to said predetermined fundamental frequency, an output impedance coupled to the anode of said tube, said output impedance including a network that is parallel resonant at said predetermined fundamental frequency, an inductor and a first capacitor coupled respectively in series between said anode and said output impedance, said inductor and first capacitor being series resonant at said fundamental frequency, a source of direct current potential, a second capacitor coupled to said anode, a choke coil coupled between said second capacitor and said source of direct current potential, a third capacitor coupled to said output impedance, a first diode having an anode to cathode path coupled between said third capacitor and said anode, and a second diode having an anode to cathode path coupled from between said second capacitor and said choke coil to said third capacitor, signals developed across said inductor and first capacitor being rectified and applied to said anode.

References Cited in the file of this patent

UNITED STATES PATENTS

| | | |
|---|---|---|
| 1,557,860 | Mathes | Oct. 20, 1925 |
| 2,029,014 | Bode | Jan. 28, 1936 |
| 2,276,873 | Rambo et al. | Mar. 17, 1942 |
| 2,378,797 | Shade | June 19, 1945 |
| 2,890,420 | Bradburd | June 9, 1959 |
| 2,936,420 | Tyler | May 10, 1960 |

FOREIGN PATENTS

| | | |
|---|---|---|
| 545,258 | Italy | June 25, 1956 |